United States Patent
Hayashi et al.

(10) Patent No.: US 9,835,520 B2
(45) Date of Patent: Dec. 5, 2017

(54) SPATIAL-MODE OPTICAL POWER MEASUREMENT METHOD AND APPARATUS

(71) Applicant: SUMITOMO ELECTRIC INDUSTRIES, LTD., Osaka-shi, Osaka (JP)

(72) Inventors: Tetsuya Hayashi, Kanagawa (JP); Tetsuya Nakanishi, Kanagawa (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/453,921

(22) Filed: Mar. 9, 2017

(65) Prior Publication Data

US 2017/0268959 A1 Sep. 21, 2017

(30) Foreign Application Priority Data

Mar. 17, 2016 (JP) .................................. 2016-053962

(51) Int. Cl.
*G01M 11/00* (2006.01)

(52) U.S. Cl.
CPC ........ *G01M 11/333* (2013.01); *G01M 11/334* (2013.01)

(58) Field of Classification Search
CPC .... G01M 11/30; G01M 11/33; G01M 11/333; G01M 11/334; G01M 11/335; G01M 11/336; G01M 11/337; G01M 11/338; G01M 11/332

USPC ......................................................... 356/73.1
See application file for complete search history.

(56) References Cited

U.S. PATENT DOCUMENTS

| | | | | |
|---|---|---|---|---|
| 6,456,369 B1* | 9/2002 | Ohki | .................... | G02B 6/3807 356/73.1 |
| 6,788,397 B1* | 9/2004 | Golowich | .............. | G01M 11/33 356/73.1 |
| 9,513,189 B2* | 12/2016 | Jiang | ...................... | G01M 11/33 |
| 2012/0177065 A1* | 7/2012 | Winzer | .............. | H04B 10/2581 370/480 |
| 2012/0250008 A1* | 10/2012 | Hayashi | ............... | G01M 11/335 356/73.1 |
| 2014/0314410 A1* | 10/2014 | Mumtaz | ............. | H04B 10/2581 398/65 |
| 2016/0202142 A1* | 7/2016 | Wang | .................. | G01M 11/3109 356/73.1 |

FOREIGN PATENT DOCUMENTS

| | | |
|---|---|---|
| JP | S62-063833 A | 3/1987 |
| JP | 2012-242238 A | 12/2012 |

* cited by examiner

*Primary Examiner* — Gordon J Stock, Jr.
(74) *Attorney, Agent, or Firm* — Drinker Biddle & Reath LLP (57) ABSTRACT

Light output from a light source is distributed to intensity modulators that are associated with different spatial modes and that have different modulation conditions. An operation for receiving modulated light from each of the intensity modulators is performed for SDM fibers of different lengths while the light source is in operation, and pieces of optical power information are determined for respective spatial modes to be measured, from difference information regarding the lengths and the received optical powers.

12 Claims, 3 Drawing Sheets

SPATIAL-MODE OPTICAL POWER MEASUREMENT METHOD AND APPARATUS

BACKGROUND OF THE INVENTION

1. Field of the Invention

The present invention relates to a method and an apparatus for measuring optical powers for respective spatial modes in a space-division multiplexing (SDM) optical fiber (hereinafter, referred to as an "SDM fiber"). The present invention is also intended as a method for measuring transmission losses for respective spatial modes by measuring optical powers of the respective spatial modes.

2. Description of the Related Art

To increase the capacity of fiber-optic communications, optical transmission technologies using a plurality of spatial modes have been studied recently. Since such optical transmission technologies use SDM fibers as transmission media, transmission loss measurement is performed for each spatial mode to evaluate the quality of the SDM fibers.

JP 62-063833A discloses a technique for measuring transmission loss for each spatial mode. According to this technique, light output from a light source is split into two beams. The two beams are caused to interfere with each other after one of the two beams is caused to propagate along a reference optical fiber and the other beam is caused to propagate along a measurement-target optical fiber. The levels of interference due to spatial modes are observed individually for the respective spatial modes by using group-delay differences.

JP 2012-242238A discloses a technique for measuring transmission loss for each spatial mode in a few-mode optical fiber by using the cutback method. According to this technique, a step of sequentially inputting light having different wavelengths to a measurement-target optical fiber by using a wavelength-tunable light source and of measuring two-dimensional optical power distributions for the respective wavelengths is performed while changing the length of the measurement-target optical fiber. Then, after proportions of the optical powers of the measurement results for the respective spatial modes subjected to the measurement are determined for each of the set different lengths of the optical fiber, the optical powers for the respective spatial modes are determined on the basis of the determined proportions and optical power of output light on the light source side.

According to the cutback method, when transmission losses for respective spatial modes are measured, measurement light is input to one end of a measurement-target optical fiber having a first length in a certain incident condition, and optical power of the light output from the other end is measured. Then, the measurement-target optical fiber is cut back (that is, part of the measurement-target optical fiber is cut off so as to shorten the measurement-target optical fiber), and output light optical power is measured again for the measurement-target optical fiber having a second length that is shorter than the first length. Transmission losses for the respective spatial modes in the measurement-target optical fiber are determined from a difference between the output light optical power obtained for the measurement-target optical fiber having the first length and the output light optical power obtained for the measurement-target optical fiber having the second length and a difference between the first length and the second length.

SUMMARY OF THE INVENTION

Aspects of the present invention provide optical power or transmission loss measurement method and apparatus capable of efficiently and highly accurately measuring optical powers or transmission losses for respective spatial modes in an SDM fiber.

An optical power measurement method according to an aspect of the present invention for measuring optical powers for respective spatial modes in a measurement-target optical fiber in which M spatial modes are transmittable, where M is greater than or equal to 2, includes a modulating step, an input step, a light-receiving step, and an optical power obtaining step. In the modulating step, M light signals are individually modulated using different modulation conditions and M modulated light signals are generated. In the input step, the M modulated light signals are input to the measurement-target optical fiber from a first end of the measurement-target optical fiber to cause the M modulated light signals to transmit in the respective M spatial modes. In the light-receiving step, output signals from a second end of the measurement-target optical fiber are collectively received without distinguishing between the spatial modes, and optical power of the output signals collectively received is converted into an electric signal, the second end of the measurement-target optical fiber opposing the first end of the measurement-target optical fiber, the electric signal being analog data or digital data. In the optical power obtaining step, the electric signal is analyzed and optical powers $P_m$ (m=1, 2, . . . , M) for the respective M spatial modes output from the second end of the measurement-target optical fiber are obtained as pieces of optical power information for the respective M modulated light signals. Further, transmission losses for the respective spatial modes can also be calculated based on the obtained pieces of optical power information.

A spatial-mode optical power measurement apparatus according to another aspect of the present invention includes a light source, a splitter, a spatial mode input device, a photoelectric converter, and an optical power information obtaining unit. The splitter splits light from the light source into beams, the number of which is equal to M that represents the number of two or more spatial modes to be measured. The spatial mode input device includes a plurality of modulators that modulate the respective beams obtained by the splitter using different modulation conditions and generate M modulated light signals, input ends to which the respective M modulated light signals are separately input, and an output end from which the M modulated light signals are output to a measurement-target optical fiber in which M spatial modes are transmittable. The photoelectric converter collectively receives output signals of the spatial mode input device via the measurement-target optical fiber and converts optical power of the output signals collectively received into an electric signal, which is analog data or digital data. The optical power information obtaining unit analyzes the electric signal and measures, as pieces of optical power information for the respective M modulated light signals, optical powers $P_m$ (m=1, 2, . . . , M) for the respective M spatial modes output from the measurement-target optical fiber.

According to the aspects of the present invention, optical powers or transmission losses for respective spatial modes in an SDM fiber can be measured efficiently and highly accurately.

DESCRIPTION OF THE PREFERRED EMBODIMENTS

According to the cutback method of the related art, the input end of an SDM fiber, which is a measurement-target optical fiber, and the output end of an excitation dummy optical fiber are aligned and connected together and the output end of the SDM fiber and the input end of a light-reception dummy optical fiber are aligned and connected together such that excitation and light reception are enabled for only a single spatial mode (core), and optical power $P_{out1}$ is measured for the single spatial mode (core). Thereafter, the SDM fiber is cut back, and the output end of the SDM fiber and the input end of the light-reception dummy optical fiber are aligned and connected together again, and then optical power $P_{out2}$ is measured. Such a cutback operation needs to be repeatedly performed as many times as the number of spatial modes to be measured, resulting in a long transmission loss measurement time.

On the other hand, in the case where optical powers $(P_m)_{out1}$ (m=1, 2, ..., M) are measured for all spatial modes (cores) to be measured, the SDM fiber is cut back, and then optical powers $(P_m)_{out2}$ are measured for all the spatial modes (cores) to be measured, cutting back is performed only once. However, since the excitation dummy optical fiber is aligned again between the measurement of the optical powers $(P_m)_{out1}$ and the measurement of the optical powers $(P_m)_{out2}$, connection loss at the joint of the SDM fiber and the excitation dummy optical fiber changes. This change in the connection loss results in a measurement error.

A method according to an embodiment of the present invention measures optical powers and transmission losses for respective spatial modes in an SDM fiber, which is a measurement-target optical fiber. As kinds of the SDM fiber, a multicore optical fiber (hereinafter, referred to as "MCF") having a common cladding that includes a plurality of cores each of which guides a single spatial mode (single mode), a multimode optical fiber including a single core that guides a plurality of spatial modes, and a multimode multicore optical fiber having a common cladding that includes a plurality of cores each of which guides a plurality of spatial modes are known. Note that a core that transmits multiple modes may be a coupled multicore in which a plurality of cores function as a single core herein.

According to a first aspect of the present invention, an optical power measurement method includes a modulating step, an input step, a light-receiving step, and an optical power obtaining step. Light from a light source is split into a plurality of beams, the number of which is equal or lager than M (≥2) that represents the number of spatial modes to be measured. In the modulating step, the plurality of resultant beams are input to respective intensity modulators each associated with one of different modulation conditions and are individually modulated into different modulated signals. In the input step, the plurality of modulated signals individually obtained in the modulating step are input to an SDM fiber, which is a measurement-target optical fiber, so that the plurality of modulated signals serve as the M spatial modes different from each other (the spatial modes corresponding to the respective modulated signals are different from each other).

In the light-receiving step, a light-receiving device (photoelectric converter) collectively receives output signals from the SDM fiber without distinguishing between the spatial modes and converts optical power of the output signals into an electric signal, which is analog data or digital data. In the optical power obtaining step, an analyzing step for analyzing data of the electric signal obtained in the light-receiving step is performed, and optical powers $P_m$ (m=1, 2, ..., M) for the respective M spatial modes output from the SDM fiber are obtained as pieces of optical power information for the respective modulated signals. In the analyzing step, the optical powers for the respective modulated signals may be calculated by performing Fourier-transform-based calculation processing after digitizing data of the electric signal, or the optical powers for respective frequencies may be obtained by processing the analog data of the electric signal using an electrical spectrum analyzer.

A second aspect of the present invention is transmission loss measurement which is an extension of the optical power measurement according to the first aspect. In the second aspect, optical power measurement is performed twice while changing the length of the SDM fiber. That is, optical powers $(P_m)_{out1}$ for the respective M spatial modes are obtained as first optical power information in the SDM fiber adjusted to have a first length $L_1$ (first obtaining step). In addition, optical powers $(P_m)_{out2}$ for the respective M spatial modes are obtained as second optical power information in the SDM fiber adjusted to have a second length $L_2$ that is shorter than the first length $L_1$ (second obtaining step). In a transmission loss calculating step, transmission losses $\alpha_m$ $(=\Delta P_m/\Delta L)$ for the respective M spatial modes to be measured are calculated from a length difference $\Delta L$ $(=L_1-L_2)$ between the first length $L_1$ and the second length $L_2$ and optical power difference information $\Delta P_m$ $(=10 \log_{10}((P_m)_{out2})-10 \log_{10}((P_m)_{out1}))$ of a difference between values of the first optical power information and the second optical power information in decibel. According to this aspect, transmission losses for respective M spatial modes in an SDM fiber are measured efficiently.

In the modulating step according to the first and second aspects of the present invention, light from a single light source is split into beams, the number of which is greater than or equal to M that represents the number of spatial modes to be measured, and individual intensity modulators are disposed to correspond to the respective beams. The plurality of individually disposed intensity modulators modulate the respective beams using different modulation conditions. The modulation conditions may be intensity modulation (chopping) at different frequencies, that is, frequency modulation for making the frequencies of pulses different; or gating modulation (gating) at different timings, that is, timing modulation for making the timings at which pulses having the same frequency are generated different.

In the case of intensity modulation at different frequencies, the sensitivity of measurement can be increased because approximately half the power of light output from the light source can be received although the received power level depends on the modulated waveform. In the case of gating modulation at different timings, a temporal change in the optical power for light-gating timings corresponding to one of the spatial modes to be measured is detected by synchronizing the light-receiving timings in the light-receiving step with the light-gating timings of the corresponding one of the plurality of intensity modulators in the analyzing step. Such gating modulation makes implementation of the measurement system easier because a temporal change in the optical power just needs to be measured for each spatial mode.

In a third aspect of the present invention, an input optical fiber having an electric field distribution of spatial modes identical to that of the SDM filter, which is the measurement-target optical fiber, may be prepared, and a preliminary input step, a preliminary light-receiving step, and a preliminary optical power obtaining step may be performed using this input optical fiber prior to the input step. In this case, in the preliminary input state, modulated signals individually obtained by modulation are input to the input optical fiber so that the modulated signals serve as the respective M spatial modes. In the preliminary light-receiving step, output signals from the input optical fiber, which include the M spatial modes to be measured, is received directly by a photodetector. In the preliminary optical power obtaining step, as in the optical power obtaining step, the output signals received in the preliminary light-receiving step are processed and optical powers $P_m'$ (m=1, 2, ..., M) for the respective M spatial modes are obtained as pieces of optical power information for the respective modulated signals individually obtained by modulation using different modulation conditions.

Further, the input optical fiber and the SDM fiber are joined together after the output end of the input optical fiber and the input end of the SDM fiber having the first length $L_1$ are aligned so as to have identical spatial modes. In such a connection state, the output signals of the input optical fiber are input to the SDM fiber in the input step. Thereafter, the light-receiving step and the optical power obtaining step are performed as in the first aspect, and optical powers $(P_m)_{out1}$ for the respective M spatial modes are obtained. After these steps have been performed, transmission losses $\alpha_m$ ($=\Delta P_m/\Delta L_1$) of the SDM fiber are calculated by respectively using $P_m'$, $10\log_{10}(P_m')-10\log_{10}((P_m)_{out1})$, and $L_1$ as $(P_m)_{out2}$, $\Delta P_m$, and $\Delta L$ in the second aspect. With this method, once the input optical fiber for which $P_m'$ has been determined is fixed, it is no longer necessary to determine $(P_m)_{out2}$ by cutting the SDM fiber every time the SDM fiber is replaced, and thus the measurement time for obtaining the second optical power information is saved.

In the first to third aspects of the present invention, it is important to input the modulated signals to the SDM fiber so that coupling between spatial modes, that is, crosstalk between spatial modes, does not occur. Crosstalk between spatial modes is preferably suppressed to be lower than or equal to −20 dB when the modulated signals are input. According to this aspect, transmission losses for the respective spatial modes can be measured highly accurately.

A crosstalk adjusting step may be provided before the process proceeds from the input step to the light-receiving step to check crosstalk between spatial modes, and a relationship between positions at which the modulated signals individually obtained by modulation using different modulation conditions are input to the SDM fiber is preferably adjusted so that the crosstalk between the spatial modes does not exceed −20 dB. After the input state of the modulated signals has been optimized in the crosstalk adjusting step, the light-receiving step and the optical power obtaining step may be performed sequentially. Alternatively, instead of the crosstalk adjusting step, an optical power correcting step may be performed after the optical power obtaining step. In this optical power correcting step, optical powers for the respective M spatial modes in the case where there is no crosstalk are calculated from the measured value of the crosstalk and the measured optical powers for the respective M spatial modes.

In a fourth aspect of the present invention, a spatial-mode optical power measurement apparatus performs the measurements according to the first to third aspects to measure optical powers or transmission losses for respective M spatial modes in an SDM fiber, which is a measurement-target optical fiber. The spatial-mode optical power measurement apparatus includes a light source, a splitter, a spatial mode input device, a photoelectric converter, and an optical power information obtaining unit.

The light source outputs light of a specific wavelength. The splitter splits the light from the light source into beams, the number of which is greater than or equal to M (≥2) that represents the number of spatial modes to be measured. The spatial mode input device includes a plurality of modulators, input ends, and an output end. The plurality of modulators modulate the respective beams obtained by the splitter, using different modulation conditions. The input ends receive respective modulated signals output from the plurality of modulators. Accordingly, a plurality of input-end optical fibers may be provided adjacent to the input end. The output end outputs the modulated signals to the measurement-target optical fiber (SDM fiber) in which at least M (≥2) spatial modes are transmittable. The photoelectric converter collectively receives the output signals of the spatial mode input device via the SDM fiber and converts optical power of the output signals collectively received into an electric signal, which is analog data or digital data. The optical power information obtaining unit analyzes data of the electric signal supplied from the photoelectric converter and measures, as pieces of optical power information for the respective modulated signals, optical powers $P_m$ (m=1, 2, ..., M) for the respective M spatial modes output from the measurement-target optical fiber.

The splitter may have as many output ends as the number of spatial modes to be measured or more. The output end of the spatial mode input device is only required to have a spatial mode arrangement that matches the spatial mode arrangement of the SDM fiber and a size substantially equal to or smaller than the size of the SDM fiber so that the output end is associated with the respective spatial modes of the SDM fiber, which is the measurement-target fiber. Accordingly, an output-end optical fiber may be provided adjacent to the output end. The input end of the SDM fiber may be fixed to the output end of the spatial mode input device so that spatial modes are appropriately input. In addition, an alignment device capable of finely adjusting both the position of the light input to the SDM fiber on a plane perpendicular to the light axis and the position in the rotation direction with respect to the light axis may be further added to the output end of the spatial mode input device.

The photoelectric converter includes a light-receiving device that collectively receives the output signals of the SDM fiber without distinguishing between the spatial modes and that outputs an electric signal including analog data or digital data corresponding to optical power of the output signals. The optical power obtaining unit may input the data of the electric signal obtained in the light-receiving step into an electrical spectrum analyzer in the form of analog data and may obtain pieces of optical power data for respective frequencies as the optical powers for respective spatial modes. Alternatively, the optical power obtaining unit may perform Fourier transform on the electric signal in the form of digital data and may obtain optical powers for respective frequencies as optical powers for the respective spatial modes.

In a fifth aspect of the present invention, the optical power obtaining unit according to the fourth aspect may include a first memory, a second memory, and a transmission loss calculating unit in order to further calculate transmission losses for the respective spatial modes. The first memory stores obtained results of first optical power information for the respective M spatial modes output from the SDM fiber adjusted to have a first length. The second memory stores obtained results of second optical power information for the respective spatial modes output from the SDM fiber adjusted to have a second length different from the first length. The transmission loss calculating unit calculates transmission losses $\alpha_m$ (m=1, 2, ..., M) per unit length of the SDM fiber for the respective M spatial modes from the first optical power information stored in the first memory, the second optical power information stored in the second memory, and a length difference $\Delta L$ between the first length and the second length. For example, the transmission losses may be calculated as transmission losses $\alpha_m$ ($=\Delta P_m/\Delta L$) as in the second aspect. Alternatively, as in the third aspect, the second optical power information may be measured in advance on the assumption that the preliminary input step and so forth are performed, and then the first optical power information of the SDM fiber may be measured.

Note that each of the plurality of modulators according to the fourth and fifth aspects is an ON/OFF modulator that performs chopping on a corresponding one of the beams distributed from the light source, and these modulators are individually controlled in accordance with different modulation conditions. As the modulation conditions, the chopping frequency may be set to different frequencies (first modulation condition) or timings of chopping may be shifted from one another for different modulators (second modulation condition). One of the first and second modulation conditions just needs to be set or selectable in the plurality of modulators. In the case of shifting timings of chopping, since timings for all the modulators need to be shifted from one another, all the modulators may be controlled integrally. In the case where the first modulation condition is set in each of the modulators, the optical power information obtaining unit preferably includes a Fourier transform unit that obtains data of the electric signal as digital data from the photoelectric converter and performs Fourier transform to obtain optical powers for respective frequencies or an electrical spectrum analyzer that obtains the electric signal as analog signal data and obtains optical powers for respective frequencies (spectra).

In a sixth aspect based on the third aspect, in the configuration of the apparatus according to the fourth and fifth aspects, the spatial-mode optical power measurement apparatus may include an input optical fiber having an electric field distribution of spatial modes identical to that of the SDM fiber and the input optical fiber may be disposed between the spatial mode input device and the SDM fiber. By performing the preliminary input step, the preliminary light-receiving step, and the preliminary optical power obtaining step using the prepared input optical fiber in advance, the same second optical power information can be used even when the SDM fiber is replaced, if the optical powers for the respective spatial modes obtained using the input optical fiber are used as the second optical power information. That is, the measurement time of the second optical power information and cutting (cutting back) of the SDM fiber performed when the second optical power information is obtained are no longer needed.

Each of the aspects described above is applicable to each of the rest of the aspects or all the combinations of the rest of the aspects. Specific examples of the optical power measurement method and the spatial-mode optical power measurement apparatus according to the aspects of the present invention will be described in detail below with reference to the accompanying drawings. Note that the present invention is not limited these examples. It is intended that the scope of the present invention is defined by the claims and includes all modifications made within the meanings and scope equivalent to the scope of the claims.

Figure 1:
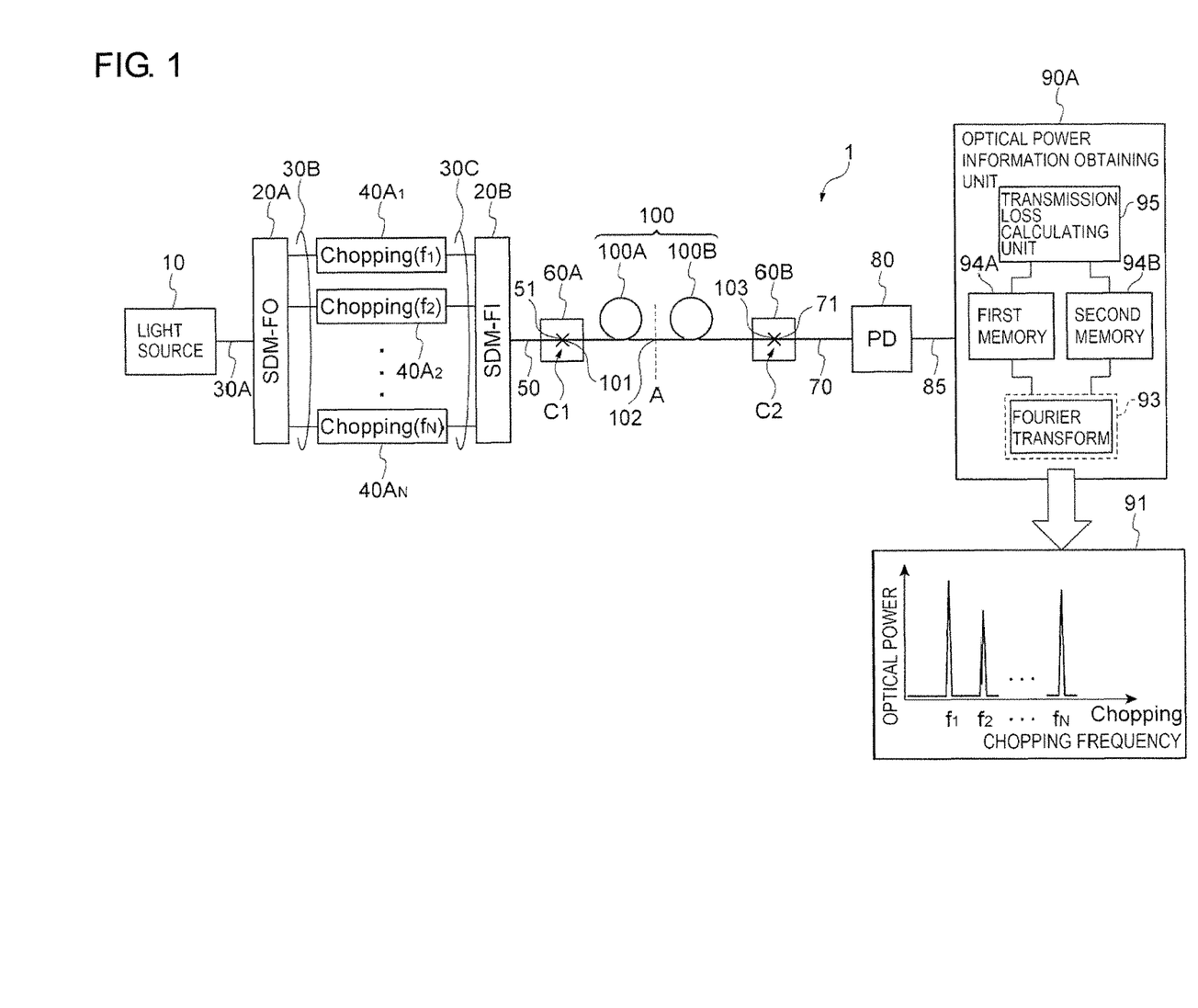
FIG. 1 is a schematic diagram illustrating a first configuration example of a spatial-mode optical power measurement apparatus that carries out a transmission loss measurement method according to an embodiment of the present invention.

FIG. 1 is a schematic diagram illustrating a first configuration example of a spatial-mode optical power measurement apparatus 1 that carries out an optical power measurement method according to an embodiment of the present invention. The spatial-mode optical power measurement apparatus 1 according to the first configuration example includes a light source 10, intensity modulators $40A_1$ to $40A_N$ each assigned one of different spatial modes to be measured, a light-receiving device (hereinafter, referred to as "PD") 80 which is a photoelectric converter, and an optical power information obtaining unit 90A that obtains optical power information (or transmission loss) for each of the spatial modes to be measured. Note that in the optical power measurement apparatus 1, the intensity modulators $40A_1$ to $40A_N$ perform ON/OFF modulation (chopping) on input optical power at different frequencies.

A joint C1 is a joint of an input end 101 of an SDM fiber 100, which is a measurement-target optical fiber, and an output end 51 of an input SDM fiber (hereinafter, referred to as an "input optical fiber") 50 for inputting all spatial modes. The SDM fiber 100 and the input optical fiber 50 are connected to each other by a connecting device (alignment device) 60A with the cores thereof being aligned. On the other hand, a joint C2 is a joint of an output end 103 of the SDM fiber 100 and an input end 71 of an output SDM fiber (hereinafter, referred to as an "output optical fiber") 70 for receiving all the spatial modes. The SDM fiber 100 and the output optical fiber 70 are connected to each other by a connecting device (alignment device) 60B with the cores thereof being aligned.

The input optical fiber 50 preferably has substantially the same structure as the SDM fiber 100. For example, both the measurement-target optical fiber and the input optical fiber are uncoupled MCFs, coupled MCFs, multimode optical fibers (hereinafter, referred to as "MMFs"), or few-mode optical fibers. Note that the SDM fiber 100 and the input optical fiber 50 are connected to each other by the connecting device 60A so that crosstalk between the spatial modes is low enough (at least lower than or equal to −20 dB) so as not to influence measurement. As the output optical fiber 70, an MMF having a sufficiently large core diameter and having the number of spatial modes that is sufficiently larger than that of the SDM fiber 100 may be used.

In terms of measurement efficiency, the connecting device 60A that implements alignment and connection of the SDM fiber 100 and the input optical fiber 50 preferably has a V-shaped groove for arranging the SDM fiber 100 and the input optical fiber 50 along the longitudinal axis. In this case, rotational alignment can be performed with respect to the longitudinal axis of the fibers and, at the same time, axis alignment based on the outer diameter of the cladding is enabled. Such a configuration is similarly applicable to the connecting device 60B that implements alignment and connection of the SDM fiber 100 and the output optical fiber 70.

A fan-out device (hereinafter, referred to as "SDM-FO") 20A that functions as a splitter for distributing light from the light source 10 to the intensity modulators $40A_1$ to $40A_N$ for the respective spatial modes is disposed between the light source 10 and the intensity modulators $40A_1$ to $40A_N$. In addition, a fan-in device (hereinafter, referred to as "SDM-FI") 20B for guiding modulated signals that have been obtained individually as different spatial modes by the intensity modulators $40A_1$ and $40A_N$ is disposed between the intensity modulators $40A_1$ to $40A_N$ and the input optical fiber 50. An input end of the SDM-FO 20A is optically connected to the light source 10 by an SDM fiber 30A, and a plurality of output ends of the SDM-FO 20A are individually connected to the respective intensity modulators $40A_1$ to $40A_N$ by respective single-mode optical fibers (hereinafter, referred to as "SMFs") 30B. On the other hand, a plurality of input ends of the SDM-FI 20B are individually connected to the respective intensity modulators $40A_1$ to $40A_N$ by respective SMFs 30C, and an output end of the SDM-FI 20B is optically connected to an input end of the input optical fiber 50. Note that the intensity modulators $40A_1$ to $40A_N$ and the SDM-FO 20A (specifically, the input end and the output ends of the SDM-FO 20A) constitute a spatial mode input device.

The PD 80 collectively receives, via the output optical fiber 70, all the spatial modes that have propagated along the SDM fiber 100 and outputs the received-light signal to the optical power information obtaining unit 90A via an electric wiring 85. The optical power information obtaining unit 90A analyzes the received-light signal supplied from the PD 80 and calculates optical powers for the respective spatial modes to be measured as described below. The optical power information obtaining unit 90A receives electric signals from the PD 80 that has received light that has propagated along the SDM fiber 100 whose length has been adjusted. These electric signals include an electric signal containing first optical power information based on output light (output signals) of the SDM fiber 100 adjusted to have a first length which is equal to the sum of the length of an SDM fiber 100A and the length of an SDM fiber 100B and an electric signal containing second optical power information of output light (output signals) of the SDM fiber 100 adjusted to have a second length which is equal to the length of the SDM fiber 100A cut at a dash line A.

The optical power information obtaining unit 90A performs Fourier analysis individually on each of the two received-light signals obtained when the length of the SDM fiber 100 is adjusted to different lengths and obtains optical power components for respective frequency components contained in each of the two received-light signals (electric signals). In this way, the optical power information obtaining unit 90A obtains the first optical power information and the second optical power information. Specifically, during Fourier analysis, the electric signal is input directly to an electrical spectrum analyzer, and consequently optical power information for each frequency can be obtained. In addition, in another example of Fourier analysis, the electric signal is temporarily converted into a digital signal and signal strength for each frequency is calculated by a Fourier transform unit. In this way, the optical power information can be obtained. Note that each of the electrical spectral analyzer and the Fourier transform unit corresponds to a processing unit 93. The obtained first optical power information and second optical power information are respectively stored in a first memory 94A and a second memory 94B of the optical power information obtaining unit 90A. A detection result 91 illustrated in FIG. 1 is an example of a detection result obtained by the optical power information obtaining unit 90A.

The optical power information obtaining unit 90A further includes a transmission loss calculating unit 95. The transmission loss calculating unit 95 calculates transmission losses for respective frequencies each corresponding to one of the spatial modes to be measured, from difference information on a difference between the first length and the second length and difference information on a difference between the first optical power information and the second optical power information. The SDM fiber 100A desirably has a length (second length) of 1 m to 22 m after the cutting off.

Figure 2:
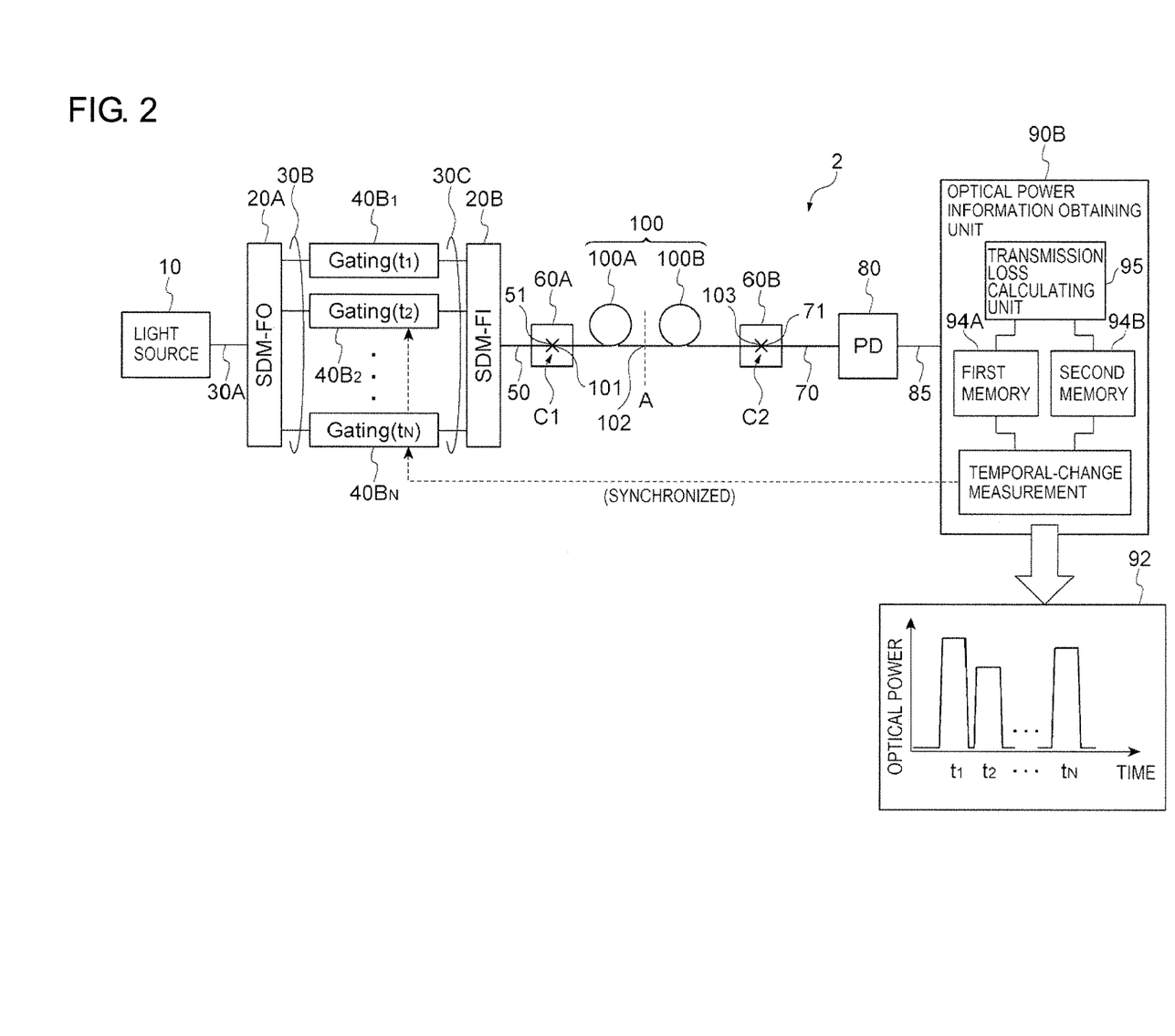
FIG. 2 is a schematic diagram illustrating a second configuration example of a spatial-mode optical power measurement apparatus that carries out a transmission loss measurement method according to an embodiment of the present invention.

FIG. 2 is a schematic diagram illustrating a second configuration example of a spatial-mode optical power measurement apparatus 2 that carries out an optical power measurement method according to an embodiment of the present invention. The spatial-mode optical power measurement apparatus 2 according to the second configuration example differs from the optical power measurement apparatus 1 according to the first configuration example in that the optical power measurement apparatus 2 includes intensity modulators $40B_1$ to $40B_N$ and an optical power information obtaining unit 90B. The rest of the configuration of the optical power measurement apparatus 2 may be the same as that of the optical power measurement apparatus 1 according to the first configuration example. Although light is output continuously from the light source 10 in the optical power measurement apparatus 2, all the intensity modulators $40B_1$ to $40B_N$ periodically operate and ON/OFF modulation (gating) control is performed so that there is a period in which each of the intensity modulators $40B_1$ to $40B_N$ exclusively operates to output light once during a single operation period.

In the optical power measurement apparatus 2 according to the second configuration example, the intensity modulators $40B_1$ to $40B_N$ are disposed in parallel with one another between the SDM-FO 20A and SDM-FI 20B and allow light distributed thereto to pass therethrough (gating the distributed light) at different timings. The SDM-FO 20A and the intensity modulators $40B_1$ to $40B_N$ are optically connected to each other by the respective SMFs 30B, whereas the SDM-FI 20B and the intensity modulators $40B_1$ to $40B_N$ are connected to each other by the respective SMFs 30C.

The optical power information obtaining unit 90B receives electric signals from the PD 80 that has received light that has propagated along the SDM fiber 100 whose length has been adjusted. These electric signals include an electric signal containing first optical power information based on output light (output signals) of the SDM fiber 100 adjusted to have a first length which is equal to the sum of the length of the SDM fiber 100A and the length of the SDM fiber 100B and an electric signal containing second optical power information based on output light (output signals) of the SDM fiber 100 adjusted to have a second length which is equal to the length of the SDM fiber 100A cut at a dash line A.

The optical power information obtaining unit 90B detects, as first optical power information and second optical power information, a temporal change in the optical power for the corresponding light-gating timings (optical power for each of the spatial modes) from two received-light signals (a series of pieces of optical power information of light sequentially received for each spatial mode) obtained when the length is set to different lengths, by processing signals collectively received in terms of space so as to synchronize the light-reception timings with the light-gating timings of the corresponding one of the intensity modulators $40B_1$ to $40B_N$. That is, since the light-gating timings at each of intensity modulators $40B_1$ to $40B_N$ are synchronized with corresponding light-reception timings at the PD 80, optical power for timings at which the intensity modulator is exclusively ON is successfully obtained by detecting the temporal change in the optical power. The obtained first optical power information and second optical power information are temporarily stored in the first memory 94A and the second memory 94B, respectively. A detection result 92 illustrated in FIG. 2 is a detection result obtained by the optical power information obtaining unit 90B. Further, the transmission loss calculating unit 95 of the optical power information obtaining unit 90B calculates transmission losses for the respective spatial modes to be measured, from difference information on a difference between the first length and the second length and difference information on a difference between the first optical power information and the second optical power information.

Note that the present invention is not limited to the configurations of the optical power measurement apparatuses 1 and 2. The light source 10 may include a wideband light source and a bandpass filter having a variable wavelength. A plurality of light sources may be used as the light source 10, and light from the plurality of light sources may be input to the respective intensity modulators $40A_1$ to $40A_N$ or $40B_1$ to $40B_N$, without using the SDM-FO 20A. An optical power splitter or the like may be used in place of the SDM-FO 20A. As the output optical fiber 70, an MMF having a sufficiently larger number of spatial modes to be measured than the SDM fiber 100 may be used. In addition, a configuration in which the PD 80 directly receives light from the SDM fiber 100 without via the output optical fiber 70 may be used. The PD 80 may preferably be a power meter capable of outputting an analog electric signal that is proportional to the optical power or the logarithm of the optical power in addition to a photodetector (PD). Fourier analysis performed by the processing unit 93 of the optical power information obtaining unit 90A can be performed by obtaining optical outputs for respectively frequencies using an electrical spectrum analyzer or received-optical-power analog-digital converter and a discrete Fourier transformer (Fourier transform unit).

Figure 3:
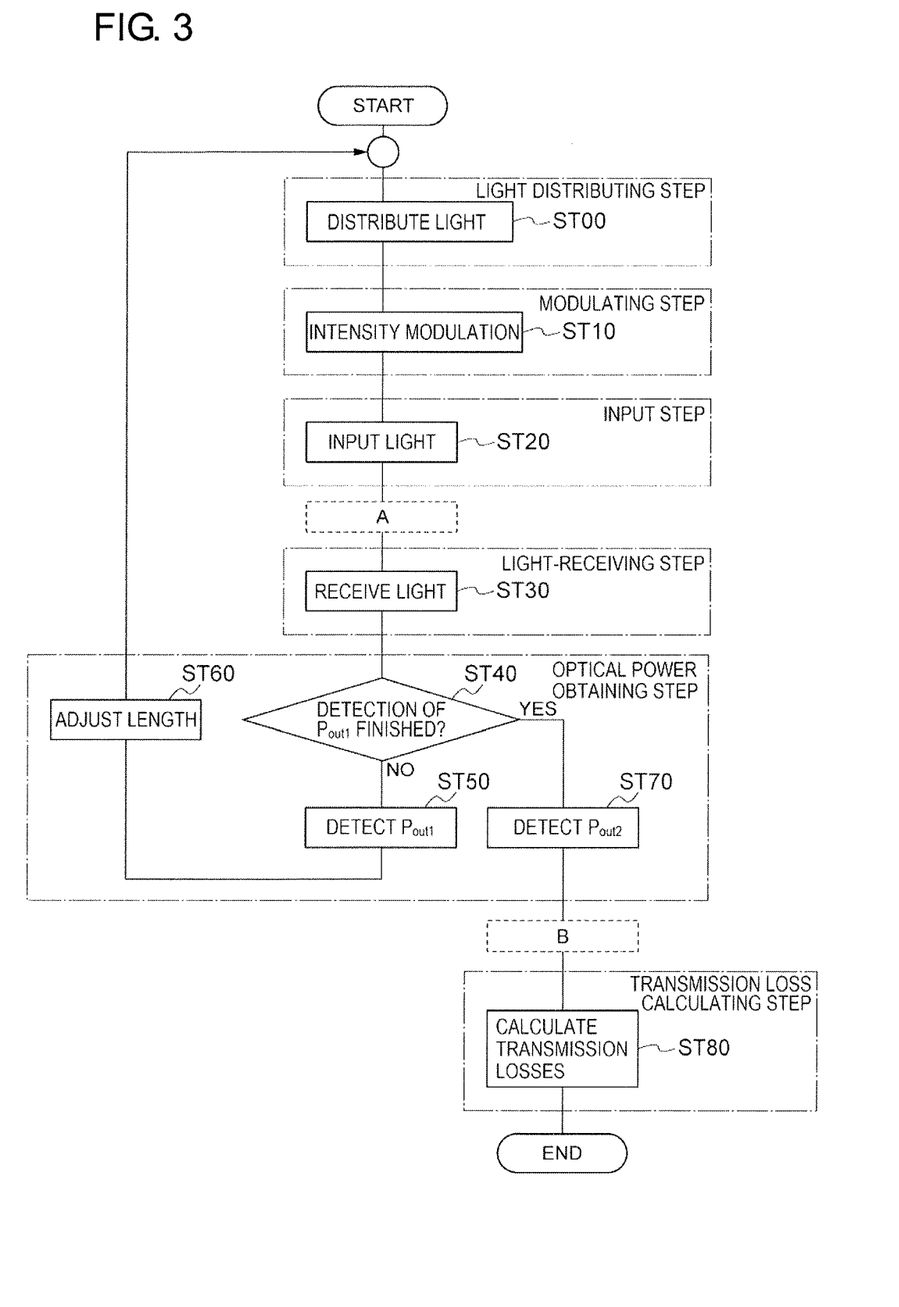
FIG. 3 is a flowchart for describing an optical power measurement method and a transmission loss measurement method according to the embodiment of the present invention.

An optical power measurement method according an embodiment of the present invention will be described next with reference to a flowchart of FIG. 3. The following description is mainly about the measurement operation performed by the optical power measurement apparatus 1, and the measurement operation performed by the optical power measurement apparatus 2 will be mentioned if needed. The optical power measurement method according to the embodiment includes a light distributing step, a modulating step, an input step, a light-receiving step, an optical power obtaining step, and a transmission loss calculating step in order to measure optical powers and further transmission losses for respective spatial modes in the SDM fiber 100.

In the light distributing step, light output from the light source 10 is distributed to the intensity modulators $40A_1$ to $40A_N$ disposed in parallel with one another between the SDM-FO 20A and the SDM-FI 20B (step ST00). Specifically, light from the light source 10 reaches the SDM-FO 20A via the optical fiber 30A and is further distributed, via the respective SMFs 30B, to the respective intensity modulators $40A_1$ to $40A_N$ each of which is associated with a corresponding one of different spatial modes. Note that a configuration in which light from a plurality of light sources configured to have the same output wavelength and the same output power is individually and directly input to the respective modulators may be used.

In the modulating step, the intensity modulators $40A_1$ to $40A_N$ perform optical power ON/OFF modulation (chopping) on the distributed light using different frequencies (step ST10). Alternatively, optical power ON/OFF modulation (gating) is performed so that there is a period in which each of the intensity modulators $40B_1$ to $40B_N$ is exclusively on as illustrated in FIG. 2.

Subsequently, in the input step, the modulated signals (light) obtained from the modulating step are input to the SDM fiber 100 (step ST20). Specifically, the modulated signals output from the respective intensity modulators $40A_1$ to $40A_N$ reach the SDM-FI 20B via the respective SMFs 30C, and light of all the spatial modes from the intensity modulators $40A_1$ to $40A_N$ is guided to the SDM fiber 100 via the input optical fiber 50. The input optical fiber 50 and the SDM fiber 100 are connected to each other with the cores thereof being aligned by the connecting device 60A so that crosstalk between the spatial modes that occurs before the modulated signals from the respective intensity modulators $40A_1$ to $40A_N$ reach the output end of the SDM fiber 100 is suppressed to be lower than or equal to −20 dB. With this configuration, intensity-modulated signals having different patterns propagate in different spatial modes in the SDM fiber 100. In the case of modulation illustrated in FIG. 2, modulation timings need to be controlled so that the signals are output at different timings for different modulated signals.

In the light-receiving step, all the modulated signals that have been obtained by the respective intensity modulators $40A_1$ to $40A_N$ and have propagated along the SDM fiber 100 while light is continuously output from the light source 10 are received (step ST30). Specifically, output signals from the SDM fiber 100 is received by the PD 80 via the output optical fiber 70, and an electric signal containing optical power information $P_{out}$ is input to the optical power information obtaining unit 90A from the PD 80.

In the optical power obtaining step, a received-light signal that is obtained as the first optical intensity information $P_{out1}$ of the SDM fiber 100 (measurement-target optical fiber adjusted to have the first length) is obtained (step ST50). Specifically, optical powers for respective frequencies contained in the electric signal are obtained by performing Fourier analysis on the received-light signal obtained from the PD 80 as the first optical power information $P_{out1}$ (analyzing step). In the case of the optical power measurement apparatus 2, optical powers for light-gating timings of each of the intensity modulators $40B_1$ to $40B_N$ are obtained as the first optical power information $P_{out1}$. In the case of the optical power measurement apparatus 2, a series of measurement may be repeatedly performed a plurality of times to obtain pieces of optical power information, and the average of the pieces of optical power information may be obtained as the first optical power information. Note that the first optical power information $P_{out1}$ indicates a set of pieces of first optical power information $(P_m)_{out1}$ on the respective optical powers $P_m$ (m=1, 2, ..., M) for the respective M (≥2) spatial modes to be measured.

Subsequently in the optical power obtaining step, the length of the measurement-target optical fiber is adjusted (step ST60). Specifically, the SDM fiber 100 that is prepared for detection of the first optical power information is cut at the dash line A, and the SDM fiber 100B is removed with the SDM fiber 100A and the input optical fiber 50 kept connected. The SDM fiber 100A that is left as the measurement-target optical fiber preferably has a length of 1 m to 22 m. An output end 102 of the SDM fiber 100A is connected to the input end 71 of the output optical fiber 70 by the connecting device 60B at the joint C2 with cores thereof being aligned. As described above, the light distributing step (including step ST00), the modulating step (including step ST10), the input step (including step ST20), and the light-receiving step (including step ST30) are performed again in the state where only the SDM fiber 100A is disposed as the measurement-target optical fiber between the input optical fiber 50 and the output optical fiber 70.

Further, in the optical power obtaining step, after detection (step ST40) of the first optical power information $P_{out1}$ has been finished, optical power for respective frequencies are obtained by using substantially the same method as that used for the first optical power information $P_{out1}$ by performing Fourier analysis on the received-light signal obtained from the PD 80 as the second optical power information $P_{out2}$ (step ST70). Note that the second optical power information $P_{out2}$ indicates a set of pieces of second optical power information $(P_m)_{out2}$ on the respective optical powers $P_m$ for the respective M (≥2) spatial modes to be measured.

In the transmission loss calculating step, transmission losses for the respective spatial modes to be measured are calculated from difference information on a difference between the first length and the second length of the SDM fiber 100 and difference information on a difference between the first optical power information and the second optical power information for respective spatial modes (for respective modulation conditions) obtained in the optical power obtaining step (step ST80). Specifically, a transmission loss factor [dB/unit length] for the respective spatial modes to be measured is obtained by dividing a difference between a value of the first optical power information $P_{out1}$ in decibel and a value of the second optical power information $P_{out2}$ in decibel by a difference between the first length used when the first optical power information $P_{out1}$ is detected and the second length used when the second optical power information $P_{out2}$ is detected.

Note that crosstalk between spatial modes is preferably suppressed to be lower than or equal to −20 dB at the time of input of modulated signals. Thus, a crosstalk adjusting step illustrated as a step A in FIG. 3 may be performed before the process proceeds to the light-receiving step from the input step. In the step A, crosstalk between spatial modes is checked, and a relationship between the positions at which modulated signals individually obtained by modulation using different modulation conditions are input is adjusted using the connecting devices 60A and 60B so that the crosstalk between the spatial modes does not exceed −20 dB. After the input state of each modulated beam is optimized in step A, the light-receiving step and the optical power obtaining step may be performed sequentially. Alternatively, instead of the crosstalk adjusting step, an optical power correcting step illustrated as a step B in FIG. 3 may be performed after the optical power obtaining step. In the step B, optical powers for respective M spatial modes in the case where there is no crosstalk are calculated from the measured value of the crosstalk and the measured optical powers for the respective M spatial modes.

In addition, an input optical fiber having an electric field distribution of spatial modes identical to that of the SDM fiber 100 may be prepared, and a preliminary input step, a preliminary light-receiving step, and a preliminary optical power obtaining step may be performed using this input optical fiber prior to the input step. In the examples illustrated in FIGS. 1 and 2, the input optical fiber 50 serves as this input optical fiber. These preliminary input step, preliminary light-receiving step, and preliminary optical power obtaining step are substantially the same as the input step, the light-receiving step, and the optical power obtaining step, respectively. Optical powers for the respective spatial modes may be measured as the second optical power information by using the prepared input optical fiber. In this case, there is no need to cut the SDM fiber to determine the second optical power information (cutting back of the SDM fiber 100 is no longer required) every time the SDM fiber 100 is replaced, and consequently the measurement time of the second optical power information can be decreased.

What is claimed is:

1. An optical power measurement method for measuring optical powers for respective spatial modes in a measurement-target optical fiber in which M spatial modes are transmittable, where M is greater than or equal to 2, the optical power measurement method comprising:
    a modulating step of individually modulating M light beams using different modulation conditions and generating M modulated light signals;
    an input step of inputting the M modulated light signals to the measurement-target optical fiber from a first end of the measurement-target optical fiber to cause the M modulated light signals to transmit in the respective M spatial modes;
    a light-receiving step of collectively receiving output beams from a second end of the measurement-target optical fiber without distinguishing between the spatial modes and converting optical power of the output beams collectively received into a first electric signal, the second end of the measurement-target optical fiber opposing the first end of the measurement-target optical fiber, the first electric signal being analog data or digital data; and
    an optical power obtaining step of analyzing the first electric signal and obtaining, as pieces of optical power information for the respective M modulated light signals, optical powers $P_m$ (m=1, 2, . . . , M) for the respective M spatial modes output from the second end of the measurement-target optical fiber.

2. The optical power measurement method according to claim 1,
    wherein the optical power obtaining step includes a first obtaining step of measuring optical powers $(P_m)_{out1}$ for the respective M spatial modes output from the measurement-target optical fiber adjusted to have a first length and a second obtaining step of measuring optical powers $(P_m)_{out2}$ for the respective M spatial modes output from the measurement-target optical fiber adjusted to have a second length that is shorter than the first length by a length ΔL, the second obtaining step being performed after the first obtaining step, and
    wherein the optical power measurement method further comprises transmission loss calculating step of calculating transmission losses $α_m$ per unit length of the measurement-target optical fiber for the respective M spatial modes from the optical powers $(P_m)_{out1}$, the optical powers $(P_m)_{out2}$, and the length ΔL.

3. The optical power measurement method according to claim 1, further comprising:

a preliminary input step of inputting the M modulated light signals to an input optical fiber from a first end of the input optical fiber to cause the M modulated light signals to transmit in the respective M spatial modes, the input optical fiber allowing spatial modes having an electric field distribution identical to an electric field distribution of the M spatial modes that transmit in the measurement-target optical fiber to be transmitted therein;

a preliminary light-receiving step of collectively receiving output beams from a second end of the input optical fiber without distinguishing between the spatial modes and converting optical power of the output beams collectively received into a second electric signal, the second end of the input optical fiber opposing the first end of the input optical fiber, the second electric signal being analog data or digital data;

a preliminary optical power obtaining step of analyzing the second electric signal and obtaining, as pieces of optical power information for the respective M modulated light signals, optical powers $P_m'$ (m=1, 2, ..., M) for the respective M spatial modes output from the second end of the input optical fiber; and a transmission loss calculating step of calculating transmission losses for the respective M spatial modes in the measurement-target optical fiber from the optical powers $P_m$ and the optical powers $P_m'$, wherein the M modulated light signals are input to the measurement-target optical fiber via the input optical fiber in the input step.

4. The optical power measurement method according to claim 1,
wherein the modulating step includes performing intensity modulation on the M light beams using different modulation frequencies, and
wherein the optical power obtaining step includes performing frequency analysis on data of the first electric signal.

5. The optical power measurement method according to claim 1, wherein the modulating step includes gating the M light beams at different modulation timings so as to avoid simultaneous output of two or more light beams among the M light beams.

6. The optical power measurement method according to claim 1, further comprising
a crosstalk adjusting step preceding the light-receiving step and including:
measuring crosstalk between the M spatial modes in the measurement-target optical fiber and
adjusting positions at which the respective M modulated light signals are input to the measurement-target optical fiber so as to suppress the crosstalk to be lower than or equal to −20 dB.

7. The optical power measurement method according to claim 1, further comprising
an optical power correcting step including
measuring, prior to the light-receiving step, crosstalk between the M spatial modes in the measurement-target optical fiber, and
calculating, after the optical power obtaining step, optical powers for the respective M spatial modes in a case where there is no crosstalk, from a measured value of the crosstalk and the measured optical powers for the respective M spatial modes.

8. A spatial-mode optical power measurement apparatus comprising:
a light source;
a splitter that splits light from the light source into a number of beams, the number of beams is equal to M that represents the number of two or more spatial modes to be measured;
a spatial mode input device including:
a plurality of modulators that modulate the respective beams obtained by the splitter using different modulation conditions and that generate M modulated light signals,
input ends to which the respective M modulated light signals are separately input, and
an output end from which the M modulated light signals are output to a measurement-target optical fiber in which M spatial modes are transmittable;
a photoelectric converter that collectively receives output signals of the spatial mode input device via the measurement-target optical fiber and converts optical power of the output signals collectively received into a first electric signal, the first electric signal being analog data or digital data; and
an optical power information obtaining unit including a first calculator that performs a method comprising:
analyzing the first electric signal; and
measuring, as pieces of optical power information for the respective M modulated light signals, optical powers $P_m$ (m=1, 2, ..., M) for the respective M spatial modes output from the measurement-target optical fiber.

9. The spatial-mode optical power measurement apparatus according to claim 8, wherein the optical power information obtaining unit further includes:
a first memory that stores obtained results of first optical power information for the respective M spatial modes output from the measurement-target optical fiber adjusted to have a first length; and
a second memory that stores obtained results of second optical power information for the respective M spatial modes output from the measurement-target optical fiber adjusted to have a second length different from the first length,
a second calculator that calculates transmission losses $\alpha_m$ (m=1, 2, ..., M) per unit length of the measurement-target optical fiber for the respective M spatial modes from the first optical power information stored in the first memory, the second optical power information stored in the second memory, and a length difference between the first length and the second length.

10. The spatial-mode optical power measurement apparatus according to claim 8, wherein the spatial mode input device includes
a plurality of input-end optical fibers disposed adjacent to the respective input ends such that the M modulated light signals are separately input to the respective input-end optical fibers, and
an output-end optical fiber disposed adjacent to the output end such that the M modulated light signals separately serve as the respective M spatial modes.

11. The spatial-mode optical power measurement apparatus according to claim 8,
wherein each of the M modulators includes an ON/OFF modulator, and
wherein in the ON/OFF modulator of each of the M modulators, a first modulation condition for performing frequency modulation to make frequencies of pulses different or a second modulation condition for performing timing modulation to make generation timings of pulses having an identical frequency different is selectable.

12. The spatial-mode optical power measurement apparatus according to claim 11, wherein when the first modulation condition is set in the ON/OFF modulator of each of the M modulators, the first calculator includes
   a Fourier transformer that obtains data of the first electric signal as digital data from the photoelectric converter and performs a Fourier transform to obtain optical powers for respective frequencies, or
   an electrical spectrum analyzer that obtains data of the first electric signal as analog signal data from the photoelectric converter and obtains optical powers for respective frequencies or respective spectra.

* * * * *